Patented Mar. 17, 1953

2,632,013

UNITED STATES PATENT OFFICE 2,632,013

PROCESS OF PRODUCING ORGANOSILICON COMPOUNDS

George H. Wagner, Kenmore, and Corneille O. Strother, Buffalo, N. Y., assignors to Union Carbide and Carbon Corporation, a corporation of New York No Drawing. Application October 9, 1946, Serial No. 702,084

8 Claims. (Cl. 260—448.2)

The invention relates to the production of organosilicon compounds, by which is meant compounds containing the Si—C bond.

The processes heretofore proposed for the preparation of organosilicon compounds are deficient in one way or another. It is the object of the invention to improve such processes. The invention also embraces certain new compositions of matter.

In the practice of our improved process, we react an unsaturated hydrocarbon, or an unsaturated derivative thereof, with any compound containing one or more silicon-hydrogen bonds in its molecule. Because of the ease with which they can be prepared from silicon and its alloys by known methods, we prefer, as starting materials, the partially chlorinated silanes, viz., monochlorosilane, $SiH_3Cl$, dichlorosilane, $SiH_2Cl_2$, and trichlorosilane, $SiHCl_3$, and mixtures containing one or more of these; but the reactivity depends on the Si—H bond, and the presence of halogen is unnecessary. The invention can also be applied to relatively simple organosilicon compounds containing the Si—H bond, such as methyldichlorosilane, $CH_3SiHCl_2$, or triethoxysilane,

to produce more complex substances. Other uses of the invention will become apparent as the description proceeds.

Suitable hydrocarbons are those having one or more double bonds, or a triple bond. Examples are the acyclic alkenes, such as ethylene, propylene, and n-octene; the cyclic alkenes, such as cyclohexene; the dienes, acyclic and cyclic; and the alkynes—acetylene and its homologues. Examples of derivatives of unsaturated hydrocarbons which may be used are vinyl chloride and glycerides of unsaturated fatty acids. Benzene and its homologues, which do not show unsaturation through bromine absorption, are not included in the invention.

In a prior patent it has been proposed to react hydrocarbons of all types, saturated, unsaturated and aromatic, with silicon halides, including tetrahalogenosilanes, to produce organosilicon compounds. The preferred materials and conditions appear to be aromatic hydrocarbons; temperatures above 600° C., and ranging up to 1000° C.; approximately atmospheric pressure; and no catalyst. The specific composition of the products is not disclosed in most instances. In our attempts to follow the teachings of this patent the results have been wholly unsatisfactory. The yields of organosilicon compounds have been low—in many cases negligible. Such products as have been obtained were complex mixtures, highly contaminated with undesirable by-products. In our opinion these disadvantageous features stem from the following circumstances.

Aromatic hydrocarbons and saturated aliphatic hydrocarbons have but little tendency to react with any of the silanes or substituted silanes. The tetrahalogenosilanes have little reactivity with hydrocarbons, even those which are unsaturated. The process of the patent attempts to overcome this inertia by using high temperatures, but these tend to convert the hydrocarbon into useless substances, to convert partially halogenated silanes into the inert tetrahalides, and to form unwanted polymers. In other words, red-heat temperatures, when used as a means to promote the desired reaction, do not adequately serve that purpose, but do promote undesired reactions.

The unsaturated hydrocarbons used in our invention are much more reactive than the aromatic and saturated compounds; while compounds having a silicon-hydrogen bond are far more reactive than the tetrahalogenosilanes. We use moderate temperatures not exceeding 425° C., and usually no higher than 350° C. We preferably promote reaction by the use of effectively increased pressures, or catalysts, and in many cases the best results follow the use of pressure in conjunction with catalysts.

The following are typical reactions of unsaturated hydrocarbons with partially halogenated silanes:

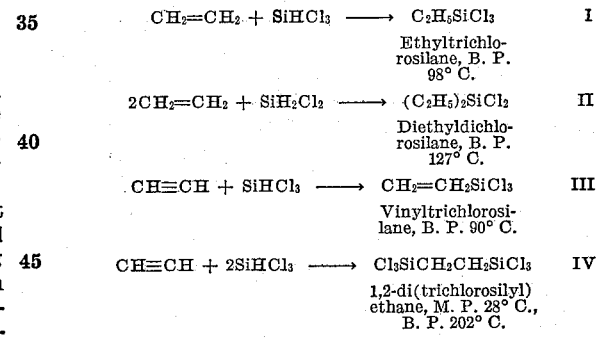

We have carried our reactions analogous to I and II with many alkenes. For example, when reacted with trichlorosilane as in I, propylene gives as the principal product n-propyltrichlorosilane, B. P. 123° C.; pentene-1 forms n-amyltrichlorosilane, B. P. 168° C.; octene-1 forms n-octyltrichlorosilane, B. P. 243° C.; and cyclohexene produces cyclohexyltrichlorosilane, B. P. 217° C. Substituted n-alkenes also react readily with the Si—H bond, as will hereinafter more fully appear.

As an example of the reactivity of dienes with halogenosilanes, butadiene and trichlorosilane produce two cyclic compounds, possible through the intermediacy of vinylcyclohexene, a dimer of butadiene:

$2CH_2=CH—CH=CH_2 + SiHCl_3 \longrightarrow$

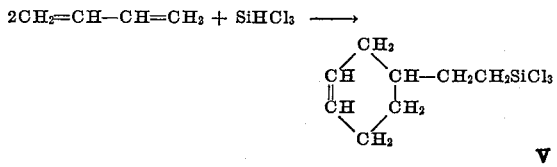

Betacyclohexenylethyltrichlorosilane, B. P. 230° C.

$2CH_2=CH—CH=CH_2 + 2SiHCl_3 \longrightarrow$

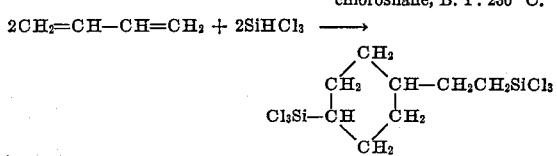

Betatrichlorosilylethylcyclohexyltrichlorosilane, B. P. 170° C. at 6 mm.

Among the substituted alkenes, vinyl chloride reacts with trichlorosilane as follows:

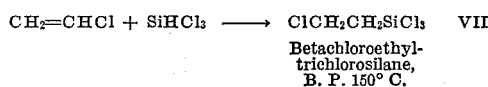

Betachloroethyltrichlorosilane, B. P. 150° C.

A more complex substituted alkene, viz. vinyltrichlorosilane (product of III), reacts with trichlorosilane forming two compounds. Analysis of one of these products indicated that it was formed as follows:

$CH_2=CHSiCl_3 + SiHCl_3 \longrightarrow Cl_3SiCH_2CH_2SiCl_3$  VIII

This product, it will be noted, is the same as is formed in IV. The other product appeared to have been formed by the reaction:

$2CH_2=CHSiCl_3 + SiHCl_3 \longrightarrow$ $Cl_3SiCH_2CH_2CH(SiCl_3)CH_2SiCl_3$  IX While the reaction between ethylene and dichlorosilane usually gives diethyldichlorosilane as the principal product, as in II above, with a lower concentration of ethylene one of the Si—H bonds in the dichlorosilane may remain intact:

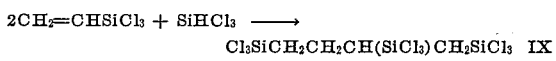

Ethyldichlorosilane, B. P. 76° C.

As has already been stated and as is illustrated in VIII and IX above, relatively simple organosilicon compounds can be converted into more complex substances by reactions of the herein-described type. As another example, ethylene reacts with methyldichlorosilane:

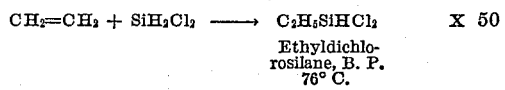

Ethylmethyldichlorosilane, B. P. 97° C.

In the foregoing reactions a double bond in one compound reacts with a silicon-hydrogen bond in another compound. In the molecule of vinyldichlorosilane, $CH_2=CHSiHCl_2$, there are present both a double bond and a silicon-hydrogen bond, and it seemed probable from our previous researches that this compound (as well as its analogs) would polymerize according to the following scheme:

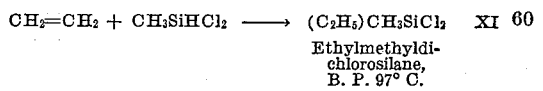

This was confirmed experimentally, and such a polymer in which $n=2$ was prepared by heating vinyldichlorosilane in a capsule at 250° C. and 270 atmospheres for 9 hours. The polymer was a colorless, viscous liquid. Under similar conditions, but with the time prolonged to 37 hours, a colorless, viscous liquid was again produced, being apparently the polymer depicted above with $n=6$ in the average formula.

It will be noted that in the polymers just described, there remain a silicon-hydrogen bond and a double bond, indicating continuing reactivity with unsaturated compounds, and hydrolyzable chlorine atoms offering the opportunity to produce interesting siloxane structures. To demonstrate the reactivity of the residual Si—H bond, vinyldichlorosilane was held at 250° C. for 39 hours under ethylene at 160 atmospheres. The product was a clear, viscous, liquid polymer containing no hydrolyzable hydrogen. Analysis indicated the average formula

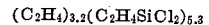

To facilitate observation and permit better control of the conditions, most of our experimental work was carried out in bombs, agitation being provided in some cases by continuous shaking. Similar results can be obtained with flowing reactants in apparatus of known design permitting the maintenance of appropriate pressures. In the reactions with which the invention is concerned, it is desirable to maintain sufficiently high concentrations of the reactants (as measured, for example, in mols per liter of reaction space) to promote effective contact between the molecules to be reacted. When one of the reactants is a gas, or a liquid readily volatile at the reaction temperature, and the reaction mixture is permitted to expand freely on heating it, the concentration of that reactant will obviously fall to a low value, thus considerably slowing the reaction rate. If, however, the reactants are charged to a closed vessel which is sealed before heating it, the initial concentration of any reactant can fall off only through its consumption by the reaction. If a reactant is a gas, it may be desirable to charge the reaction vessel to a considerable pressure to secure an adequate concentration and reaction rate, and also to supply enough of the reactant to produce an acceptable quantity of product.

In many cases the rate of reaction is such that manufacture is possible without resort to catalysts. In general, however, catalysts are advantageous. The most effective catalysts are platinum metals, particularly platinum and palladium. Platinum black, platinized silica gel, and platinized asbestos were extensively tested, the last named being preferred in most cases. Since the catalysts suffer no serious deterioration during use, and since, in general, they permit lower operating temperature to be used, they are recommended. The practice of the invention is further illustrated by the following specific examples.

*Example 1*

Forty cubic centimeters of trichlorosilane was placed in a 200 cc. steel vessel and ethylene was then introduced until the pressure reached 57 atmospheres. The vessel was sealed and heated at 250° C. for 15 hours without agitation. The product, on distillation, yielded 26 g. of ethyltrichlorosilane. The conversion of trichlorosilane to ethyltrichlorosilane was 40 mol per cent, and the efficiency 50 mol per cent. These figures are based on the constant-boiling fraction, and here, as in the other examples to follow, no correction was applied for losses in transition fractions and in handling.

On repeating the test at higher pressures, some polymerization of ethylene was found to occur.

*Example 2*

Reaction of ethylene with trichlorosilane was carried out under somewhat different conditions than those described in Example 1. In a 300 cc. Monel metal vessel were placed 100 cc. of trichlorosilane containing a little dichlorosilane, together with 2 g. of platinized asbestos carrying 5 per cent of platinum. The vessel was heated to 150° C., whereupon a pressure of 15 atmospheres, gauge, developed. Ethylene was introduced to a total pressure of 20 atmospheres, gauge. On discontinuing the introduction of ethylene the pressure dropped to the initial 15 atmospheres in a matter of seconds. Additional ethylene was introduced in three successive stages, to pressures of 27, 30 and 25 atmospheres respectively. Each time the pressure dropped to its initial value in less than 2 minutes. During these ethylene injections the temperature of the contents of the bomb rose about 8° C., indicating the occurrence of a reaction. After a further introduction of ethylene to 27 atmospheres, the pressure fell rapidly to 13 atmospheres due to conversion of trichlorosilane to the less volatile ethyltrichlorosilane. After another addition of ethylene to 27 atmospheres, 5 minutes elapsed before the pressure dropped to 13–15 atmospheres. Finally, the pressure was raised to 33 atmospheres by an ethylene addition, but thereafter the pressure fell only to 29 atmospheres, indicating that practically all of the trichlorosilane had been used up. The total time from the first addition of ethylene to the final completion of the reaction was only 13 minutes.

*Example 3*

Cyclohexene (78 g.) and trichlorosilane (134 g.) were heated in a 200 cc. steel vessel for 14.5 hours at 250° C. Cyclohexyltrichlorosilane was recovered in the amount of 119 g., equivalent to a 56 per cent conversion based on the trichlorosilane. The test was repeated at lower temperatures, but these gave lower yields. Below 150° C. there was no reaction.

*Example 4*

Trichlorosilane (50 cc.) was heated under vinyl chloride at 38 atmospheres initial pressure in a 100 cc. steel vessel. The temperature was 200° C., and the time 15 hours. Betachloroethyltrichlorosilane in the amount of 36 g. was recovered. Under these uncatalyzed conditions the temperature required is high enough to polymerize vinyl chloride to some extent.

*Example 5*

Pentene-1 (100 cc.) and trichlorosilane (100 cc.) were heated in a 200 cc. steel vessel ta 350° C. for 14 hours. Amyltrichlorosilane (73.5 g.) was recovered from the product.

*Example 6*

This example shows the effect of a catalyst on the reaction of Example 5. Pentene-1 (13 g.) and trichlorosilane (27.1 g.) were placed in a 50 cc. glass ampoule with 0.025 g. of platinum black, and heated at 75° C. for 6 days. From the product there was recovered 26.5 g. of amyltrichlorosilane. Platinized asbestos and platinized silica gel were also effective catalysts. At the same low temperature (75° C.), pentene-1 and trichlorosilane formed no amyltrichlorosilane in 29 days in the absence of a catalyst.

*Example 7*

This example illustrates the effect of a catalyst on the reaction between ethylene and trichlorosilane, and is to be compared with Example 1.

Trichlorosilane (50 cc.) was placed in a 200 cc. steel vessel with 0.1 g. of platinum black, and heated under ethylene at an initial pressure of 106 atmospheres. The temperature was 100° C., and the time 42 hours. Ethyltrichlorosilane was recovered in the amount of 48.9 g., representing a conversion of 60 mol per cent and an efficiency of 62 per cent. On repeating the test, it was found that reaction occurred at temperatures as low as 25° C. It was also found that continuous agitation of the reaction vessel increased the conversion, and shortened the time required. Thus a 78 mol per cent conversion was reached in 3 hours. Palladium was found to be an effective catalyst.

*Example 8*

Dichlorosilane (22.3 g.) was charged to a 300 cc. Monel metal vessel with 1.0 g. of platinized asbestos carrying 12 per cent of platinum. Ethylene was introduced to a pressure of 67 atmospheres. The vessel was then heated at 100° C. with agitation for 7 hours. Diethyldichlorosilane (11.6 g.) was recovered from the product. In a similar test without a catalyst the yield of diethyldichlorosilane was smaller, although the temperature was raised to 230° C.

*Example 9*

Trichlorosilane (50 cc.) was placed in a 300 cc. Monel metal vessel with 3 g. of platinized asbestos, and acetylene was then introduced to an initial pressure of 17 atmospheres. The vessel was heated at 175° C. with agitation for 3 hours. From the product, there were isolated 33.6 g. of vinyltrichlorosilane and 7.6 g. of 1,2-di(trichlorosilyl) ethane. The total conversion of trichlorosilane to these compounds was 52 mol per cent.

As has already been indicated, our invention does not embrace reactions involving tetrahalogenosilanes. Many tests were carried out in which $SiCl_4$ was heated with ethylene, styrene, butadiene and acrylonitrile respectively, with temperatures, pressures, times, and catalysts which had been found to bring about reaction when trichlorosilane was used. There was no evidence that the $SiCl_4$ reacted with any of the unsaturated compounds.

In support of the statements hereinbefore made that our process depends on the reactivity of the Si—H bond, and that the presence of halogen in the reactants is unnecessary, we cite the following:

*Example 10*

Triethoxysilane (50 cc.) and 0.5 g. of platinized asbestos were placed in a 300 cc. stainless steel pressure vessel. Ethylene was subsequently pumped in to 67 atmospheres (at 25° C.) and the vessel was agitated and heated for 30 minutes at 150° C. Ethyltriethoxysilane, corresponding to a 52 mol per cent conversion of triethoxysilane by the following reaction, was isolated from the reaction products:

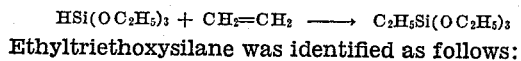

Ethyltriethoxysilane was identified as follows:

| Analysis | Theoretical | Found |
|---|---|---|
| Percent Carbon | 50.0 | 49.4 |
| Percent Hydrogen | 10.5 | 10.7 |

| Properties | Reported [1] | Found |
|---|---|---|
| Boiling Point (° C.) | 158–160 | 158–159 |
| Refractive Index | 1.3853 ($N_D^{22}$) | 1.3910 ($N_D^{20}$) |
| Density | 0.928 (22°/4°) | 0.90 (25°/4°) |

[1] J. Org. Chem. 5, 443 (1940).

What is claimed is:

1. A process for the production of organosilicon compounds which comprises reacting a non-aromatic unsaturated hydrocarbon with a silane of the group consisting of halogenosilanes and alkoxysilanes having at least one Si—H bond while heating the reactants at substantially constant volume, at a temperature not substantially above 350° C. and in the presence of a catalyst metal of the platinum group.

2. A process for the production of organosilicon compounds which comprises reacting an alkyne with a silane of the group consisting of halogenosilanes and alkoxysilanes having at least one Si—H bond while heating the reactants at substantially constant volume and at a temperature not substantially above 350° C.

3. A process for the production of organosilicon compounds which comprises reacting an alkene with a silane of the group consisting of halogenosilanes and alkoxysilanes having at least one Si—H bond while heating the reactants at substantially constant volume, at a temperature not substantially above 350° C. and in the presence of a catalyst metal of the platinum group.

4. A process for the production of organosilicon compounds which comprises reacting ethylene with a silane of the group consisting of halogenosilanes and alkoxysilanes having at least one Si—H bond while heating the reactants at substantially constant volume, in the presence of a catalyst metal of the platinum group, and at a temperature not above 425° C.

5. A process for the production of organosilicon compounds which comprises reacting ethylene with triethoxysilane while heating the reactants at substantially constant volume, in the presence of a platinum catalyst, and at a temperature not above about 350° C.

6. A process for the production of organosilicon compounds which comprises heating a diene with a silane of the group consisting of halogenosilanes and alkoxysilanes having at least one Si—H bond at a temperature not substantially above 350° C. and in the presence of a catalyst metal of the platinum group.

7. A process for the production of organosilicon compounds which comprises heating an alkyne with a silane of the group consisting of halogenosilanes and alkoxysilanes having at least one Si—H bond at a temperature not substantially above 350° C. and in the presence of a catalyst metal of the platinum group.

8. A process for the production of organosilicon compounds which comprises reacting acetylene with trichlorosilane while heating the reactants at substantially constant volume, in the presence of a platinum catalyst, and at a temperature not above about 350° C.

GEORGE H. WAGNER.
CORNEILLE O. STROTHER.

REFERENCES CITED

The following references are of record in the file of this patent:

UNITED STATES PATENTS

| Number | Name | Date |
|---|---|---|
| 2,379,821 | Miller | July 3, 1945 |
| 2,407,181 | Scott | Sept. 3, 1946 |
| 2,438,520 | Robie et al. | Mar. 30, 1948 |
| 2,510,853 | Barry | June 6, 1950 |

FOREIGN PATENTS

| Number | Country | Date |
|---|---|---|
| 44,934 | Russia | Nov. 30, 1945 |